United States Patent [19]

Busch

[11] 4,456,358
[45] Jun. 26, 1984

[54] FILM HOLDER APPARATUS FOR FIELD AND STUDIO CAMERAS

[76] Inventor: Douglas I. Busch, 3828 Crosby St., Rockford, Ill. 61107

[21] Appl. No.: 477,637

[22] Filed: Mar. 21, 1983

[51] Int. Cl.³ ............................................. G03B 17/26
[52] U.S. Cl. ................................................... 354/285
[58] Field of Search ............... 354/276, 277, 278, 279, 354/281, 283, 284, 285; 378/184, 187

[56] References Cited

U.S. PATENT DOCUMENTS

| | | | |
|---|---|---|---|
| 2,326,075 | 8/1943 | Smith et al. | 354/285 |
| 3,091,168 | 5/1963 | Craig | 354/284 |
| 4,001,847 | 1/1977 | McGrath | 354/276 |

*Primary Examiner*—A. A. Mathews
*Attorney, Agent, or Firm*—Dick & Harris

[57] ABSTRACT

A film holder apparatus for field and studio cameras in which one or more sheets of film are maintained positively locked within a film holder frame in a crimped position so as to preclude undesirable sagging, shifting and bowing of the film prior to or during photography operations. Automatic film loading elements cooperate with the film holder frame to enable facilitated insertion and positioning of the film within the apparatus. Indexing ridges maintain the film in position, as gradual crimping takes place responsive to the insertion of a center plate member which cams the film rest plates adjacent the film sheets, outwardly against these sheets.

15 Claims, 9 Drawing Figures

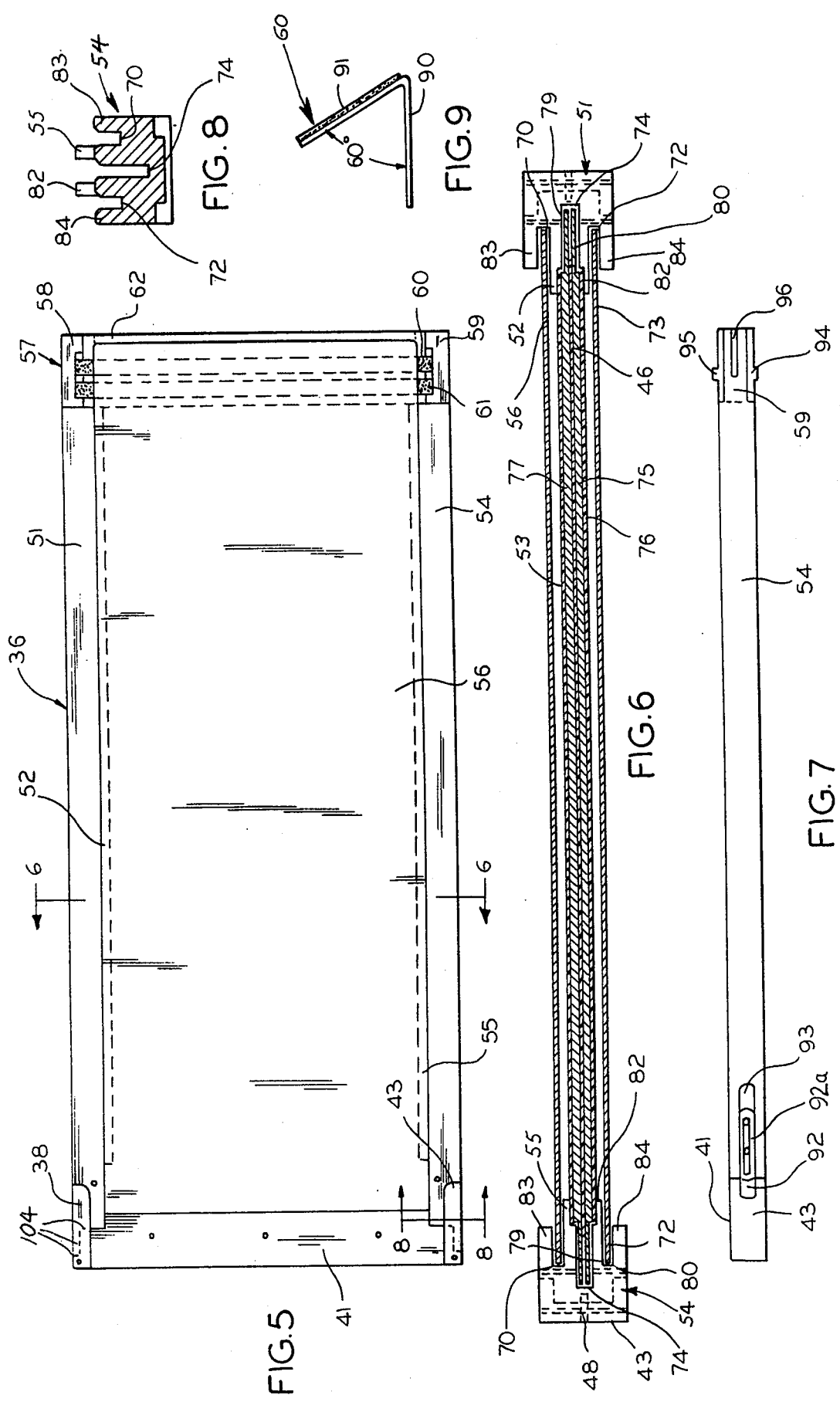

FILM HOLDER APPARATUS FOR FIELD AND STUDIO CAMERAS

BACKGROUND OF THE INVENTION

The present invention relates in general to photography equipment and in particular to a film holder apparatus for the facilitated introduction and positive maintenance of one or more sheets of photographic film within field and studio photography cameras.

Ever since the end of the late 19th Century, photographers have relied upon the large format field or studio camera for purposes of photographing subjects onto substantially large negatives, which are in turn developed into photographs of equivalent size. Utilization of such large format photography techniques offers substantial photographic detail, depth and other known and desired benefits to such photographs.

In association with such photography techniques, and particularly in association with such large format photography devices, film holders have been utilized at the backs of such cameras to removably maintain sheets of film in place for manual loading, photographing, and manual removal therefrom. For many years, such conventional large format film holding devices have invariably maintained two sheets of film in position within a film holder "cartridge", permitting the photographer to expose one sheet of film, to cover it from the dark for removing and reversing the position of the holder. At this point, the second film sheet is positioned, upon removal of a dark slide protective screen, for operation of the camera lens aperture and subsequent exposure of that second sheet of film. Such a film holder apparatus "cartridge" has typically been positionable at the rear of the camera as to place the sheets of film on a substantially firm planar support at a position equivalent to the location of the ground plate, on which an image is preliminarily focused. With such large format photographic camera devices, the photographer will focus on its subject until the image is appropriately displayed on the ground glass focusing element within the camera. At the time of proper focus, the film holder apparatus is inserted into the back of the camera after movement of the spring biased focusing surface, in which a planar supporting surface within the film holder is capable of maintaining the film at a position closely proximate to the previous "focused" position upon the ground glass.

In the majority of prior art film holder apparata, the one or two film sheets maintained within the cartridge were maintained relatively "freely" in a substantially narrow groove without positive locked maintenance to prevent against shifting or "migration" of the film within the holder. This construction would often result in movement, sliding or "bowing" of the film about its longitudinal axis. Such potential movement, sliding and bowing would often result in potential distortions in the photograph to frustrate focusing accuracy as originally attempted when focusing the camera.

Yet additional problems have been experienced with conventional and prior art film holder apparata for such large format cameras by way of deterioration often experienced with fabric-hinged film access gates. Undesirable leakage of light into various abutting edge locations on such devices would often adversely affect the quality of the ultimate photograph eventually developed.

It is thus an object of the present invention to provide a film holder apparatus for the facilitated introduction and positive maintenance of photographic film sheets into large format field and studio cameras, which film holder precludes against undesirable shifting, sliding, bowing and or migration of the film once loaded into the holder apparatus.

It is another object of the invention to provide such a film holder apparatus, which maintains the film in accurate focusing position relative to the lens so as to preclude the need for the taking of additional "insurance" shots, while precluding the need for the photographer to develop "compensating adjustments" in his focusing or photography techniques.

Yet another object of the invention is to provide such a film holder apparatus, which precludes the inadvertent leakage of light into the film holder apparatus, by eliminating conventional fabric flap gates and abutment regions.

Other objects of the invention include the provision of a film holder apparatus of increased strength and durability, in standard large camera format sizes, which are interchangeable with a variety of brands of camera.

Additional objects include the accurate positioning of film during the film loading operation through reliance upon positive locking and indexing edges as well as reliance upon staggered internal peripheral ridges to further preclude against the leakage of light into the film holding region.

Applicant has sought to develop, by way of his invention a film holder apparatus which may be efficiently manufactured and reasonably priced, which is further capable of operating in a facilitated manner relative to the loading and unloading of film or dark slides—in an environment which separates and precludes interference between the film being loaded into the film holder, with conventional film holder spring light trap mechanisms.

These and other objects of the invention will become apparent in light of the present specification and drawings.

SUMMARY OF THE INVENTION

The present invention comprises a film holder apparatus for the facilitated introduction and positive maintenance and securement of one or more sheets of photographic film within field and studio cameras, of the type in which such film is maintained at an exposure position proximate to one or more film rest plates. In such cameras, one or more dark slides are removably positioned proximate to the sheets of film within the holder to permit or preclude exposure of the film as a result of the opening of the camera's lens.

The film holder apparatus comprises film holder frame means describing a substantially quadrilateral region in which the one or more sheets of photographic film, film rest plates and dark slides of substantially equivalent shape, are positioned to enable exposure of such film as desired. The film holder frame includes a pair of side frame members, a top frame member and a bottom frame member integrally attached end to end, to form and enclose the quadrilateral region. These frame members further describe a series of substantially continuous aligned component retention ridges along the interior peripheral edges of the frame members for cooperation with the film rest plates, the sheets of photographic film and the dark slides.

A first of the one or more sheets of photographic film may be removably affixed in a position within the quadrilateral region immediately proximate to a first of the one or more film rest plates. The outer peripheral edge of the first sheet of film is capable of being substantially and tightly crimped between the outer peripheral edges of the proximate first film rest plate (along the first side of the film) and the respective component retention ridge proximately located along the second side of the first sheet of film—all towards positively locking the first film sheet therebetween to avoid undesirable sagging, shifting and bowing of the film relative to both the rest plate and the component retention ridge. Automatic film loading means cooperate with the film holder frame means, the retention ridges and the film rest plates to enable insertion and positioning of the film within the film holder apparatus in a facilitated manner, relative to the rest plates, towards "crimping" in a substantially gradual manner, the film's outer peripheral edges between the proximate component retention ridges and the peripheral edges of the proximate film rest plate along the second and first sides of the film respectively.

In the preferred embodiment of the invention, the series of retention ridges along the interior peripheral edge of the frame structure describes a centrally located, axially planar loading area into which the automatic film loading means may be slidingly inserted and removed in a reciprocating fashion. A first film rest plate is restrainably positioned immediately proximate to this loading area along the first side, and a second film rest plate is positioned along the second opposite side of the loading area immediately proximate thereto. Each of the first and second film rest plates cooperate with reciprocatable automatic film loading means through planar interference therewith.

The automatic film loading means urges each of these first and second rest plates outwardly from the loading area as the automatic film loading means is inserted into the loading area. This, in turn, causes the outer peripheral edges of these rest plates to crimp respective ones of the adjacent sheets of film positioned immediately outwardly of them against the respective retention ridges juxtaposed to the opposite sides of the film sheets. Conversely, the film rest plates are relaxed upon the withdrawal of the automatic film loading means from the loading area, so as to release the "grip" on the outer peripheral edges of the film exerted by the previously urged rest plate edges bearing against the outer positioned retention ridges on the opposite sides of the film sheets. Withdrawal of the loading means thus releases the sandwiched edges of the film from compression to permit sliding of the film sheets into and out of position within the quadrilateral region.

In this preferred embodiment described hereinabove, a second sheet of photographic film is utilized in addition to the first sheet, in a position removably fixed along the outer surface of the second film rest plate. The outer peripheral edge of the second sheet of film is similarly capable of being substantially and tightly crimped between the outer peripheral edges of the second film rest plate along the film sheet's first side and the component retention ridge proximately located along the second outer side of the second sheet of film. This positively locks the second sheet of film therebetween upon insertion of the automatic film loading means into the loading area. Additionally, two dark slides are removably positioned along each of the outermost second surfaces of the first and second sheets of film, to alternatively permit or preclude exposure of the sheets of film upon the user's activation of the lens. Each of the two dark slides are slidingly received in dark slide retention ridges for sliding reciprocation into their respective positions about the respective sheets of film.

The dark slides are preferably inserted into their position within their respective retention ridges through a plurality of slots positioned on the lower frame member of the film holder frame means. The dark slides are reciprocatable, at will, for the purpose of positioning fresh film sheets within the quadrilateral region and for precluding the inadvertent admission of undesirable exposure light into the quadrilateral region until such time as the photographer is ready and desirous of exposing the film through operation of the camera lens. Each of the dark slides utilized in this embodiment cooperates with a series of wedge springs positioned immediately proximate to the slots in which a pair of wedge shaped springs with textile fabric surfaces thereon cooperate with the dark slides as they are positioned so as to prompt, through spring biasing, consistent light blockage prior to desired exposure. Preferaly the "light trap" comprises a double "wedge spring" construction with each of the pair of traps bearing against each of the dark slides, of a stainless steel construction with felt surfacing.

On each side of the two rest plates, the retention ridges describe positions into which the photographic film sheets may be inserted, with respective indexing ledges to limit the travel of the film when it is placed inside the quadrilateral region of the film holder apparatus. This further precludes the inadvertent longitudinal "shift" of the film and perfects "alignment" of the film and the edges thereof with the respective film rest plates, retention ridges, and dark slides.

In the preferred embodiment, the automatic film loading means comprises a substantially flat planar camming plate element which reciprocates in sliding fashion, to accommodate its insertion and removal from the loading area as described hereinabove. The camming plate includes grasping means for the facilitated manipulation of the camming plate by a user, as desired. Furthermore the camming plate is of such a thickness and shape as to gradually urge each of the film rest plates, and in turn the respective outer peripheral edges outwardly upon its insertion into the loading area, to in turn cause the peripheral edges of the film rest plates to crimp the respective aligned edges of the sheets of film juxtaposed thereto, against respective outwardly positioned retention ridges. This accomplishes the simultaneous and positive locking of both sheets of film within the film holder apparatus, into appropriate position while precluding shifting, bowing and sliding one the camming plate is fully inserted. The automatic film loading means further includes camming plate locking means for removably maintaining the camming plate means in fixed attachment within the film holder apparatus upon complete insertion thereinto.

The camming plate itself preferably emanates into and out of its position within the loading area from a region proximate to the top frame member, wherein the camming plate cooperates with its common side frame members to reciprocate therealong. This particular configuration further includes grasping means which comprise the actual top frame member, where the top frame member is removably restrainable in position adjacent the side frame members by the camming plate locking means. In this embodiment the camming plate locking means further covers and encloses the abutting edges of the top and side frame members to further preclude the inadvertent undesirable leakage of light into the quadrilateral region at the location of such abutments.

Each of the film rest plates utilized in the invention comprises a rest plate member of a substantially resilient material capable of sliding in a facilitated manner into engagement with the camming plate member. Preferably, both the camming plate member and the one or more film rest plate members are fabricated of a substantially durable plastic material, such as bakelite.

The bottom end of the camming plate includes reciprocating travel restriction means to preclude inadvertent removal of the camming plate means from the loading area and frame holder means, thereby limiting its sliding extent to a position between a fully inserted position and an outer extended position in which the majority of the camming plate is outside of the quadrilateral region. The travel restriction means includes a plate locking member on the lower end of the camming plate which cooperates with component retention ridges in the side frame members, to so preclude the outright removal of the camming plate from the side frame members.

In the preferred embodiment of the invention the camming plate locking means comprise a plurality of plate locking means located at the top side of the camming plate as well as frame locking means on each of the side frame members in operable alignment with respective ones of the plate locking means. The plate locking means and the frame locking means are operably fastenable with one another upon the complete insertion of the camming plate into the loading area to preclude inadvertent separation and movement of the camming plate from within the loading area. The fastening of said plate locking means and said frame locking means together is releasable to permit subsequent withdrawal of the camming plate from the loading area, as desired by a user.

In this embodiment the plate locking means comprises hinged pivotable corner plate members, each having an aperture positioned along its interior surface that adjoins the side frame members. Each of the frame locking means comprises a post capable of being telescopically received within the aperture in the corner plate aperture, to effectively preclude against the inadvertent separation and movement of the camming plate within the loading area. The frame locking member further comprises hinge latching means to preclude the inadvertent pivoting of the corner plate member while locking the post into position within the interior surface aperture. Preferably the corner plate member itself is of such a shape, as previously mentioned, as to effectively cover substantial portions of adjoining frame member ends to effectively limit the extent to which light may leak into the abutment positions of the upper and side frame members, to in turn avoid the inadvertent exposure of said sheets of film within the quadrilateral region.

BRIEF DESCRIPTION OF THE DRAWINGS

FIG. 5 is an elevational front view of the film holder apparatus of FIG. 4 in which the automatic loading means has been completely closed and locked into position adjacent the remaining frames of the film holder apparatus so as to lock the film sheets into position therewithin;

FIG. 6 is an elevated cross sectional side view taken along lines 6—6 of FIG. 5 and looking in the direction of the arrows, particularly showing positioning of the plurality of dark slides, film rest plates, sheets of film and automatic film loading plate in position therebetween;

FIG. 7 is an elevated side view of the film holder apparatus of FIG. 5 showing particularly, the latch locking means utilized to maintain the automatic loading means in position restrainably affixed to the remainder of the frame members;

FIG. 8 is a cross sectional view of a side frame member taken along lines 8—8 of FIG. 5 and looking in the direction of the arrows showing particularly the restraining ridges and indentions for positioning of the photographic film, slide and rest plate elements; and FIG. 9 is an elevated side view of one of two wedge spring assemblies utilized as light trap means in the preferred embodiment of the present invention.

DETAILED DESCRIPTION OF THE DRAWINGS

Figure 1:
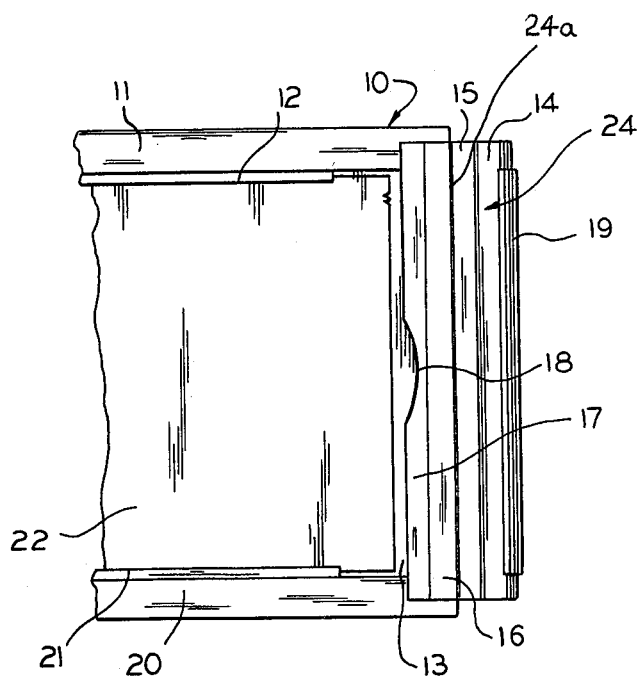
FIG. 1 of the drawings is partial elevated front view of a prior art conventional film holder apparatus showing particularly the film loading region with fabric hinged loading elements opened for film loading.

While this invention is susceptible of embodiment in many different forms, there is shown in the drawings and will herein be described in detail, one specific embodiment, with the understanding that the present disclosure is to be considered as an exemplification of the principals of the invention and is not intended to limit the invention to the embodiment illustrated.

In FIG. 1, prior art conventional film holder 10 is shown as including side frame members 11 and 20 with emanating ridge portions 12 and 21 respectively. Film closure device 24 is shown in its "open" configuration where pivotable top frame member 15-14 pivots along fabric 24A from its closed juxtaposed position relevant to fixed top frame member 17. Top frame element 14-15 is thus pivotable to the open illustrated configuration so as to permit sliding insertion of film sheet 22 by sliding the peripheral edges of sheet 22 under flange portions 12 and 21 along side frame memeber 11 and 20 respectively. Finger aperture 18 is also shown within fixed top frame element 16-17, as is light trap element 19 which occupies the portion of the frame immediately adjacent finger aperture 18 to further preclude the emergence of light into the frame holder area when film 22 is in position atop typical metal rest plate 13, located in a position substantially midway the depth of film holder 10. In the conventional construction, a dark slide (not shown in FIG. 1) may be slid in from a position opposite top frame-film loading portion 24 to cover film sheet 22, until such time as the film holder is in place within the back, focusing area, of a field camera. In such typical construction, the film holder is symmetric about its single rest plate so as to be capable of maintaining two sheets of film in position along either side, to permit a photographer to merely reverse the position of the entire holder to load and or unload either sheet of film. Equivalently, the reverse side of the single rest plate 13 would be utilized as would be a second dark slide, not shown.

Figure 2:
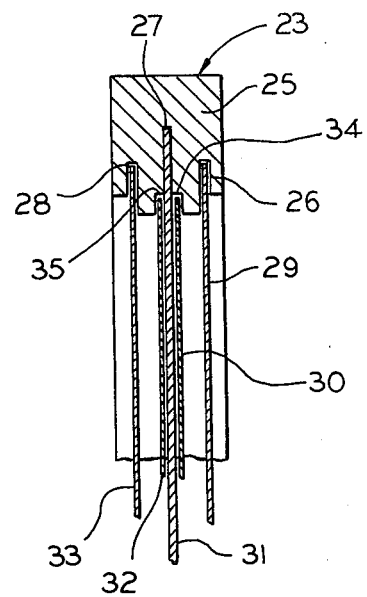
FIG. 2 is a cross-sectional elevated side view of such a prior art conventional film holder apparatus, particularly showing ridge positions for the dark slides, sole film rest plate and sheets of film therein.

A cross section of an equivalent prior art film holder is shown in FIG. 2 in which film holder 23 is illustrated as including side frame member 25 with retention ridges 26, 34, 27, 35, and 28. As shown, rest plate 31 (typically of metal construction) is centrally located relative to the depth of the holder, within retention ridge 27, while film sheets 30 and 32 are maintained in relative loose sliding fit within retention ridges 34 and 35 respectively. Such a "loose" construction precludes positive gripping of the peripheral edges of film sheets 30 and 32 thereby permitting "bowing", sagging and drifting to occur within retention ridges 34 and 35 respectively. Dark slides 29 and 33 are slidingly and removably located within retention ridges 26 and 28 respectively, whereby the dark slides are removed as a photographer is prepared to photographically expose a desired sheet of film. For example, if one assumes that the lens of the camera is located to the left of film holder 23, a photographer would remove dark slide 33 so as to permit the exposure of film sheet 32 upon opening of the camera's lens aperture.

Figure 3:
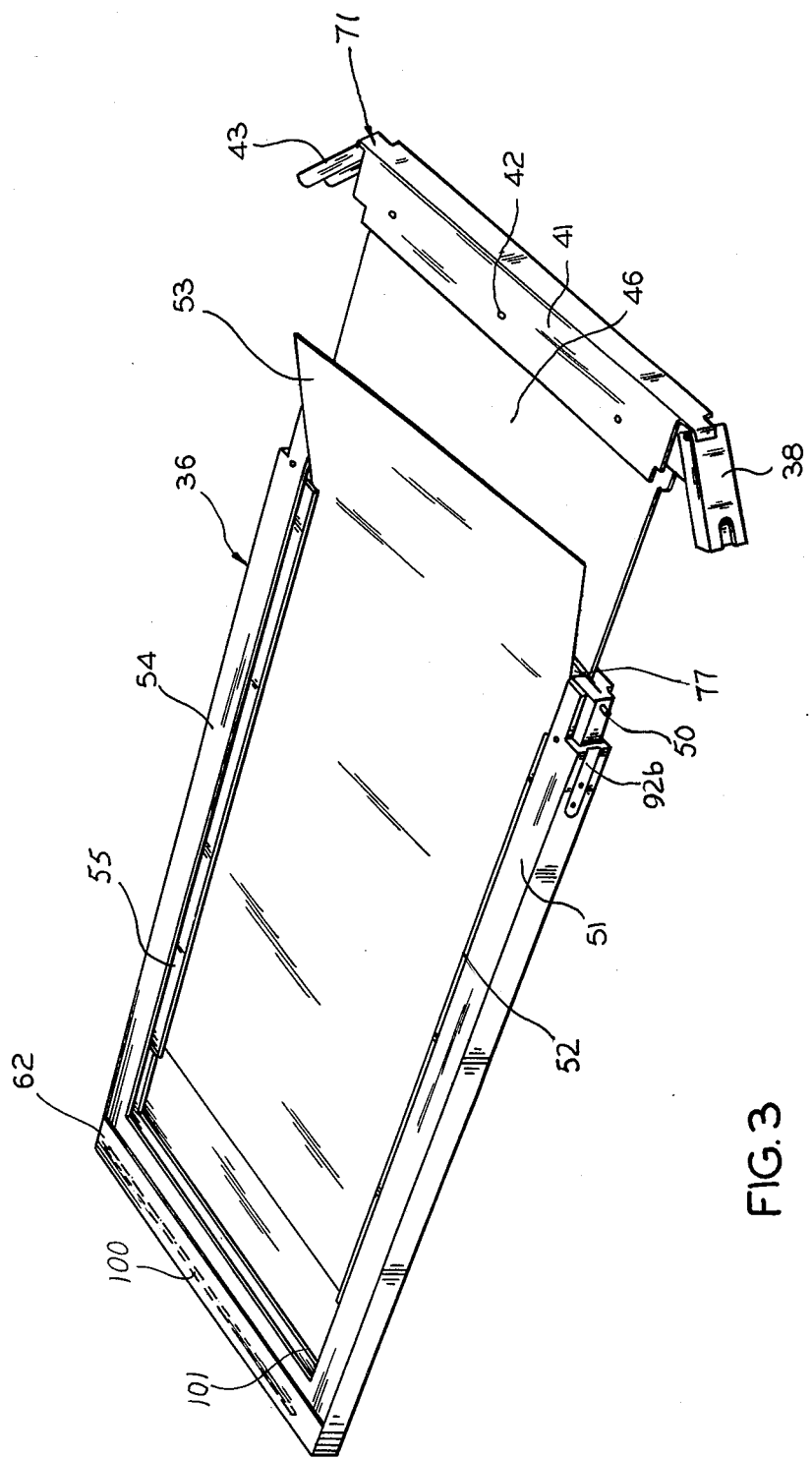
FIG. 3 is a side perspective view of applicant's present invention showing, particularly, partial withdrawal of the automatic film loading means together with a sheet of film partially in position within the quadrilateral region thereof.

In applicant's present invention a positive locking system is utilized to positively grip and restrain the film in place within its appropriate retention ridge. Applicant's inventive film holder 36 is shown in FIG. 3 as comprising side frame members 54 and 51 having retention ridge shoulders 55 and 52 respectively, as well as a bottom frame member 62 and top frame member 41. In this particular embodiment of the invention, top frame member 41 comprises the grasping means and thus is part of automatic film loading means 71, which further includes camming plate 46 together with camming plate locking components, such as corners 38 and 43, post 50 and latch 92B. Also shown in FIG. 3 is film rest plate 77 restrainably positioned between film sheet 53 being loaded into film holder 36 and camming plate 46.

In operation, camming plate 46 is withdrawn from its position central to film holder 36 so as to release compression placed against film rest plate 77 when camming plate 46 is completely inserted into film holder 36. Removal of camming plate 46 from its position within the loading area, just below film rest plate 77, is accomplished by releasing cam plate locking corners 38 and 43, by grabbing top frame member 41 and by pulling camming plate member 46 outwardly away from its position within the loading area. When plate 46 is fully withdrawn, film sheets such as film sheet 53 on either side of the two rest plates, can be slidingly inserted under retention ridge shoulders 52 and 55 for example, in a position immediately adjacent film rest plate 77. The bottom-most end of film sheet 53 is slid into the film position within film holder 36 until it abuts indexing ledge 101 which keeps film sheet 53 from inadvertently shifting in the longitudinal direction and precludes its approaching and interfering with the wedge-spring light traps contained within bottom frame element 62. At such time as both sheets of film are in place against their respective film rest plates, grasping means 41 is driven inwardly to insert camming plate 46 back into the work area thereby re-applying an outward force to the rest plates which in turn cause the peripheral edge of the film sheets to be tightly and fixedly crimped between the outer peripheral edge of the film rest plate and the abutting retention ridge shoulder.

Through such a construction, the previously mentioned bowing, sagging and drifting of the film within the device is avoided, which is especially important when realizing that the film holders are placed in a substantially verticle position when utilized in a field camera subjecting a "nonsecured" film sheet to much potential for picture distorting bowing, sagging and migration. Also shown in FIG. 3 is the phantom outline of dark slide slot 100 which permits sliding insertion of one of two dark slides from the bottommost frame member of the device proximate to light traps not shown in FIG. 3. The respective dark slide occupies a position immediately above retention ridge shoulders 52 and 55 in the slot formed thereabove, so as to shield the film until exposure of the film is desired by the photographer.

Figure 4:
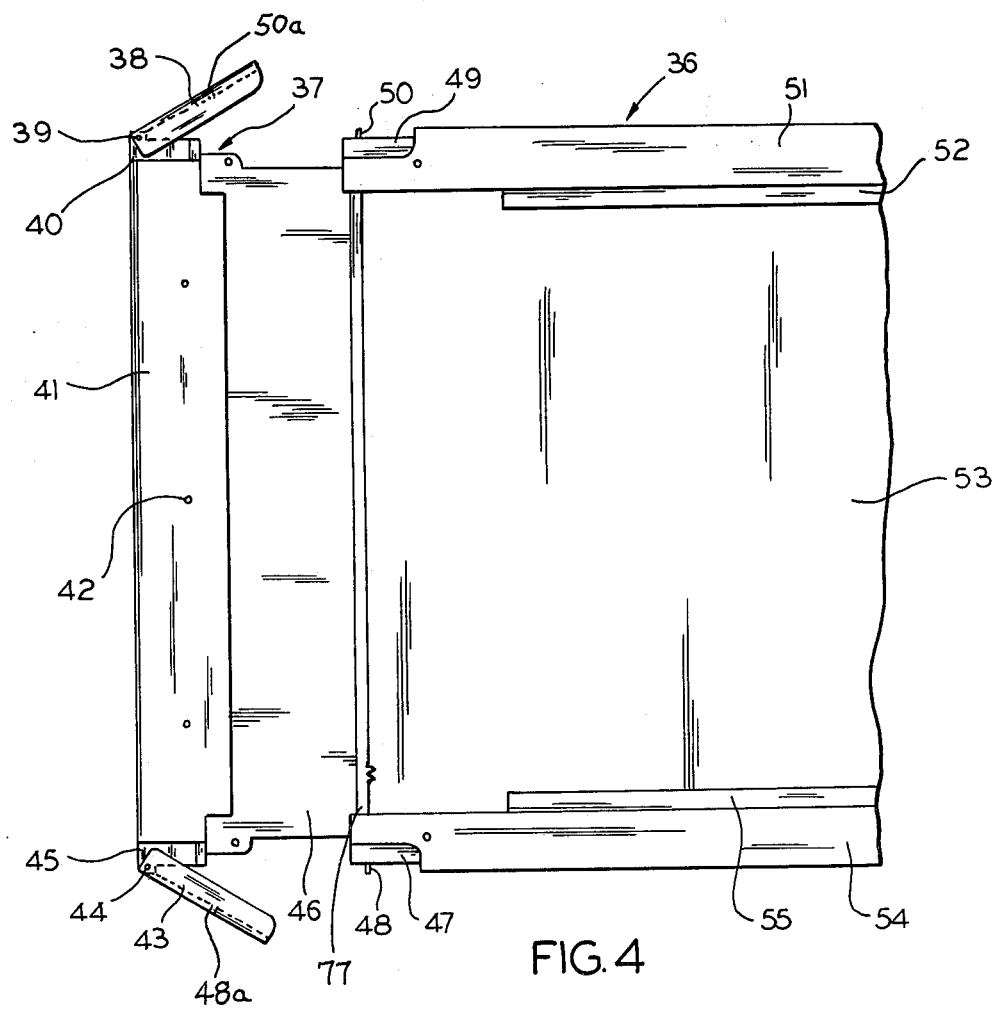
FIG. 4 is an elevational front view of the present invention showing a sheet of film and dark slide in position therewithin, as well as the automatic loading mechanism closely aligned for subsequent attachment.

The automatic film loading means and film holder construction is shown in FIG. 4 in which film holder apparatus 36 is shown as equivalently comprising side frame members 51 and 54 with retention ridge shoulders 52 and 55 respectively. Film sheet 53 is shown in position immediately atop film rest plate 77, both being positioned under retention ridge shoulders 52 and 55. Camming plate 46 is shown in a second configuration in which yet more of plate 46 has been inserted into the loading area central to the film holder apparatus, so as to exert yet increased outward compressive force against the film rest plates. The sliding of camming plate 46 past film rest plate 77 is in part effectuated through utilization of bakelite materials for each of these components, which permits not only effective sliding therebetween but also increased resilience of the materials for effective creation and release of bearing forces against the sheets of film being restrainably maintained in position within film holder apparatus 36. Grasping means 41, here comprising the top frame member of apparatus 36, serves to guide camming plate 46 into position within the loading area. Locking corners 38 and 43 serve to cooperate with recessed regions 49 and 47, respectively, as well as side frame post 50 and 48 respectively, to lock camming plate 46 completely within apparatus 36 upon the abutment of side frame members 54 and 51 with top frame member 41. At the time of abutment, corner hinge 38 is pivoted until post 50 fills post aperture 50A in alignment therewith. In equivalent fashion hinged corner 43 is rotated until post 48 fills post aperture 48A. At that time, latches emanating from each of the side frame members 51 and 54, respectively engage pivoted corners 38 and 43 to preclude their inadvertent outward pivoting which would otherwise potentially release posts 50 and 48. Hinged corners 38 and 43 revolve about pivots 39 and 44 on corner shoulders 40 and 45, respectively.

Film holder apparatus 36 is shown in its completely closed configuration in FIG. 5 where camming plate 46 has been inserted completely into the loading area centrally located within the film holder apparatus so as to exert the maximum outward bearing force against the rest plates and in turn the film and retention ridge shoulders—to maintain the film in a positively crimped fixed position within the film holder. Dark slide 56 is shown in position uppermost in apparatus 36, having been slidingly received by way of insertion through apertures in bottom frame member 62. Bottom frame member 62 shown in break away fashion, includes corners 58 and 59 as well as wedge springs 60 and 61 which comprise "light trap" elements for specific cooperation with the dark slides. One such light trapping wedge spring is shown in FIG. 9 in which wedge spring 60, as utilized in apparatus 36 of FIG. 5, comprises stainless steel spring assembly 90 with felt covering 91 at a preferred 60° angle. Through such construction and the incorporation of two such light traps 60 and 61 into apparatus 36, sliding and fixed positioning of dark slide 56 can be accomplished without cracks of light emanating therethrough, which would otherwise inadvertently and adversely affect the sheet of film positioned immediately below the dark slide.

In FIG. 5, side frame members 51 and 54 with retention ridge shoulders 52 and 55 shown in phantom, abut top frame member 41 attached to camming plate 46 through rivets such as rivet 42 (FIG. 4). Camming plate locking means such as locking corners 38 and 43 are U-shaped in construction so as to cover substantial portions of the abutting edges of the side frame members, where, for example, side frame member 51 abuts top frame member 41 at abutment 104. Upon closure of hinged corner 38 over abutment 104, light that would be capable of leaking in through such an uncovered abutment is further blocked out so as to maintain the integrity of the film protected within the holder apparatus.

In contrast to the cross sectional positioning of the elements of the prior art shown in FIG. 2, FIG. 6 of the drawings shows the cross sectional configuration of applicant's present invention in which side frame members 51 and 54 are shown with retention ridges 83, 52, 82, 84 and 83, 85, 82 and 84 respectively. Between the retention ridges on side frame member 51 are retention recesses 70, 74 and 72, equivalently numbered as recesses on side frame member 54. As can be seen in FIG. 6, upon insertion of camming plate 46 immediately between film rest plates 77 and 75, the rest plates in turn exert forces on the peripheral edges of film sheets 53 and 76 respectively so as to crimp film sheet 76 between rest plate 75 and retention ridge 82 while equivalently crimping the peripheral edge of film sheet 53 between rest plate 77 and retention ridges 52 and 55. Dark slides 73 and 56 serve to maintain in darkness, film sheets 76 and 53 respectively. Also shown in FIG. 6 is side frame member locking post 48 which cooperates with hinged locking corner 43 emanating from top frame member 41.

In FIG. 7 of the drawings, latching mechanism 92A which cooperates with notch 92 in hinged corner 43, is shown within side frame member groove 93 on side frame 54. Bottom frame portion 59 is also shown as including frame plys 94 through 96.

The cross sectional view of FIG. 8 shows retention ridges 83, 55, 82 and 84 in side frame member 54, as well as retention grooves 70, 74 and 72.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A film holder apparatus for the facilitated introduction and positive maintenance of one or more sheets of photographic film within field and studio cameras, of the type in which said one or more sheets of film is maintained within said film holder apparatus at an exposure position proximate to one of one or more film rest plates, and in which one or more dark slides are removably positioned proximate to one or more sheets of said film within said holder apparatus to alternatively permit or preclude exposure of said film, as a function of the opening of a lens of said camera, said film holder apparatus comprising:

film holder frame means describing a substantially quadrilateral region in which said one or more sheets of photographic film, said one or more film rest plates and one or more dark slides of substantially equivalent shape are positioned so as to enable the exposure and in turn photographing onto said film of the image of a photographic subject;

said film holder frames means including a pair of side frame members, a top frame member and a bottom frame member integrally attached end to end to form and enclose said quadrilateral region;

said frame members further describing a series of substantially continuous aligned component retention ridges along the interior peripheral edges of said frame members for cooperation with the outer peripheral edges of said rest plates, said sheets of photographic film and said dark slides, a first of said one or more sheets of photographic film being removably affixed in a position within said quadrilateral region immediately proximate to a first of said one or more film rest plates with the outer peripheral edge of said first sheet of film capable of being substantially and tightly crimped between the outer peripheral edges of said proximate first film rest plate along a first side of said film, and said respective component retention ridge proximately located along a second opposite side of said first sheet of film, towards positively locking said first film sheet therebetween to preclude undesirable sagging, shifting, and bowing of said film relative to both said proximate rest plate and said proximate component retention ridge; and automatic film loading means cooperating with said film holder frame means, said component retention ridges and said first film rest plates to enable insertion and positioning of said film within said apparatus in a facililtated manner relative to said rest plates, and for crimping in a substantially gradual manner, said film's outer pepripheral edge between said proximate component retention ridge and the peripheral edges of said proximate first rest plate along said second and first film sides respectively.

2. The film holder apparatus according to claim 1 in which said series of retention ridges along the interior peripheral edges of said frame members describes a centrally located axially planar loading area into which said automatic film loading means may be slidingly inserted and removed in a reciprocating fashion, said first of said one or more film rest plates positioned immediately proximate to said loading area on a first side;

a second of said one or more rest plates positioned on a second opposite side of said loading area immediately proximate thereto, each of said first and second film rest plates cooperating with said reciprocatable automatic film loading means through planar interference therewith;

said automatic film loading means urging each of said first and second film rest plates outwardly from said loading area as said automatic film loading means is inserted into said loading area to in turn cause the outer peripheral edges of each to crimp respective ones of said one or more sheets of film positioned immediately outwardly of said film rest plates.

3. The film holder apparatus according to claim 2 in which the invention further comprises;

a second sheet of photographic film removably fixed in position along the outer surface of said second film rest plate, the outer peripheral edge of said second sheet of film capable of being substantially and tightly crimped between the outer peripheral edges of said second film rest plate along its first side and a component retention ridge proximately located along a second outer side of said second sheet of film to positively lock said second sheet of film therebetween, upon insertion of said automatic film loading means into said loading area;

two dark slides in which one each of said dark slides is removably positioned outwardly along the respective second sides of said first and second sheets of film respectively to alternatively permit and preclude exposure of said sheets of film, each of said two dark slides being slidingly reciprocatable in dark slide retention ridges for sliding reciprocation into said respective positions about said respective sheets of film.

4. The film holder apparatus according to claim 3 in which the invention further comprises:

dark slide aperture means in said film holder frame means to permit said sliding reciprocation of each of said dark slides into and out of said quadrilateral region, said dark slide aperture means comprising a plurality of dark slide slots, one for each of said dark slides, in said bottom frame member, said dark slide slots being in respective alignment with the respective component retention ridges describing the position within said quadrilateral region in which said dark slides reside.

5. The film holder apparatus accordingly to claim 4 in which the invention further comprises:

light trap means for precluding the inadvertent entry of light into said quadrilateral region as a result of the sliding reciprocation and positioning of said dark slides, said light trap means comprising a series of light sealable wedge springs proximate to each of said two dark slide slots;

each of said wedge springs comprising a substantially resilient outwardly biased light sealing structure with substantially textile contact surface means fabricated thereon, so as to facilitate the sliding passage of said respective dark slide as it first contacts said respective spring wedge and slidingly passes same towards its position about said respective sheet of film, said respective series of wedge springs each comprising a stainless steel resilient material respectively exerting bias pressure against said dark slides both during positioning thereof and during residence of said dark slides, to seal off leaks of light from about said dark slide slot.

6. The film holder apparatus according to claim 1 in which the invention comprises one or more film indexing ledges proximate to said bottom frame member, for limiting the extent to which each of said one or more sheets of film is respectively permitted to travel upon loading into said film holder apparatus, said indexing ledge for each of said respective one or more sheets of said film serving to preclude inadvertent travel of said sheet of film upon loading, past a desired position in which said respective sheet of film is aligned, as desired, with said film rest plate, said retention ridge and said dark slide.

7. The film holder apparatus according to claim 2 in which said automatic film loading means comprises:

substantially flat planar camming plate means for reciprocatable sliding insertion into and removal from said loading area, said camming plate means including grasping means for the facilitated manipulation of same by a user as desired, said camming plate means being of such a thickness and shape as to gradually urge each of said film rest plates and, in turn, their respective outer peripheral edges, outwardly upon insertion of said camming plate means into said loading area to cause said peripheral edges of said film rest plates to crimp the respectively aligned edges of said sheets of film juxtaposed thereto, against respective outwardly positioned retention ridges, thereby simultaneously and positively locking said sheets of film into place within said film holder apparatus, said automatic film loading means including camming plate locking means for removably maintaining said camming plate means in fixed attachment within said film holder apparatus as desired.

8. The film holder apparatus according to claim 7 in which said camming plate means emanates into and out from its position within said loading area from a position proximate to said top frame member, said camming plate means cooperating for said reciprocating sliding with each of said adjacent side frame members.

9. The film holder apparatus according to claim 8 in which said grasping means comprises said top frame member, said top frame member being removably restrainable in position adjacent to said respective side frame members by said camming plate locking means, said camming plate locking means further covering and enclosing respective abutting top and side frame member edges to further preclude the inadvertent undesirable leakage of light from therebetween into said quadrilateral region.

10. The film holder apparatus according to claim 7 in which each of said film rest plates comprises a rest plate member fabricated of a substantially resilient material capable of facilitated sliding engagement with said camming plate, both side camming plate means and said one or more rest plate members being fabricated of a substantially durable plastic material.

11. The film holder apparatus according to claim 10 in which said plastic material of which said camming plate means and film rest plate member are fabricated comprises bakelite.

12. The film holder apparatus according to claim 7 in which the bottom end of said camming plate means includes reciprocating travel restriction means to preclude the inadvertent removal of said camming plate means in its entirety from said frame holder means thereby limiting the sliding extent of reciprocating travel of said camming plate means between said wholly fixed position within said holder apparatus and an outer extended position in which the majority of said camming plate is outside said quadrilateral region;

said travel restriction means including a plate lock member at the bottom of said camming plate means which cooperates with the component retention ridges in said side frame members to so preclude said outright removal of said camming plate means.

13. The film holder apparatus according to claim 7 in which said camming plate locking means comprises, a plurality of plate locking means located at the top side of said camming plate, frame locking means on each of said side frame members in operable alignment with respective ones of said plurality of plate locking means, said plate locking means and frame locking means operably fastening with one another upon the complete insertion of said camming plate into said loading area to preclude inadvertant separation and movement of said camming plate within said loading area, said locking fastening of said plate locking means and frame locking means being releasable to permit withdrawal of said camming plate means from said loading area.

14. The film holder apparatus according to claim 13 in which each of said plurality of plate locking means comprises a hinged pivotable corner plate member, each said corner plate member having an operture positioned along its interior surface, each of said frame locking members comprising a post capable of being telescopically received within said operture in each said corner plate operture respectively to effectively preclude against said inadvertent separation and movement, said frame locking member further comprising hinge latch means to preclude inadvertent pivoting of said corner plate members while maintaining said posts in position within said interior surface opertures.

15. The film holder apparatus according to claim 14 in which said corner plate member is of such a shape as to effectively cover substantial portions of adjoining frame member ends, to effectively limit the extent to which light may leak at said frame member joinder position thereby avoiding inadvertent exposure of said sheets of film within said quadrilateral region.

* * * * *

UNITED STATES PATENT AND TRADEMARK OFFICE
CERTIFICATE OF CORRECTION

PATENT NO.  : 4,456,358

DATED       : June 26, 1984

INVENTOR(S) : Douglas I. Busch

It is certified that error appears in the above-identified patent and that said Letters Patent is hereby corrected as shown below:

| | |
|---|---|
| Col. 1, line 35 | after "camera" insert the word -- so --. |
| Col. 1, line 37 | after "ground" insert the word -- glass --. |
| Col. 4, line 22 | "Preferaly" should be instead -- Preferably --. |
| Col. 4, line 48 | "respective" should be instead -- respectively --. |
| Col. 4, line 53 | "one" should be instead -- once --. |

UNITED STATES PATENT AND TRADEMARK OFFICE
CERTIFICATE OF CORRECTION

PATENT NO. : 4,456,358

DATED : June 26, 1984

INVENTOR(S) : Douglas I. Busch

It is certified that error appears in the above-identified patent and that said Letters Patent is hereby corrected as shown below:

Col. 5, line 63　　　　　　　　after "is" insert the word -- a --.

Col. 6, line 57　　　　　　　　"memeber" should be instead -- members --.

Signed and Sealed this

Eighth Day of January 1985

[SEAL]

Attest:

Attesting Officer

GERALD J. MOSSINGHOFF

Commissioner of Patents and Trademarks